United States Patent
Kim et al.

(10) Patent No.: US 9,866,341 B2
(45) Date of Patent: Jan. 9, 2018

(54) TRANSMITTER AND RECEIVER OF SIGNALS THROUGH POLARIZATION ANTENNA AND METHODS FOR CONTROLLING THE SAME

(71) Applicant: ELECTRONICS AND TELECOMMUNICATIONS RESEARCH INSTITUTE, Daejeon (KR)

(72) Inventors: Jun Woo Kim, Daejeon (KR); Seung Jae Bahng, Daejeon (KR); Go San Noh, Hwaseong-si (KR); Youn Ok Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 430 days.

(21) Appl. No.: 14/612,770

(22) Filed: Feb. 3, 2015

(65) Prior Publication Data

US 2015/0229364 A1 Aug. 13, 2015

(30) Foreign Application Priority Data

Feb. 12, 2014 (KR) .......................... 10-2014-0015971

(51) Int. Cl.
*H04J 11/00* (2006.01)
*H04L 5/00* (2006.01)
(Continued)

(52) U.S. Cl.
CPC .......... *H04J 11/003* (2013.01); *H04L 5/0051* (2013.01); *H04L 25/03343* (2013.01);
(Continued)

(58) Field of Classification Search
CPC .... H04J 11/003; H04L 5/0051; H04L 27/261; H04L 25/03343; H04L 27/2626; H04B 7/10
See application file for complete search history.

(56) References Cited

U.S. PATENT DOCUMENTS 7,933,343 B2 4/2011 Emami et al.
8,693,459 B2 4/2014 Youn et al.
(Continued)

FOREIGN PATENT DOCUMENTS

EP     EP 2381594 A1 * 10/2011 ............. H04B 10/61
KR    10-2011-0044453 A    4/2011

OTHER PUBLICATIONS

Morsy-Osman et al. Experimental Demonstration of Pilot-Aided Polarization Recovery, Frequency Offset and Phase Noise Mitigation. Optical Fiber Communication Conference and Exposition and the National Fiber Optic Engineers Conference (OFC/NFOEC) [online], Mar. 17-21, 2013 [retrieved on May 26, 2017]. Retrieved from the Internet:.*

(Continued)

*Primary Examiner* — Omar Ghowrwal
(74) *Attorney, Agent, or Firm* — Rabin & Berdo, P.C.

(57) ABSTRACT

Disclosed is a data transmitter, including: a demultiplexer configured to demultiplex a data subcarrier, and a training sequence or a pilot subcarrier included in a signal which needs to be frequency-shifted among a plurality of signals; a frequency shift unit configured to frequency-shift the demultiplexed data subcarrier based on a predetermined frequency; a superposition unit configured to generate a polarization signal by superimposing the demultiplexed training sequence or pilot subcarrier, and the frequency-shifted data subcarrier; and a polarization antenna configured to transmit a signal which need not be frequency-shifted and the generated polarization signal among the plurality of signals.

10 Claims, 7 Drawing Sheets

(51) Int. Cl.
*H04L 27/26* (2006.01)
*H04L 25/03* (2006.01)
*H04B 7/10* (2017.01)

(52) U.S. Cl.
CPC ........ *H04L 27/261* (2013.01); *H04L 27/2626* (2013.01); *H04B 7/10* (2013.01)

(56) References Cited

U.S. PATENT DOCUMENTS

2010/0329683 A1* 12/2010 Liu .................... H04B 10/2513
 398/81
2011/0096855 A1* 4/2011 Youn .................... H04B 10/532
 375/260
2012/0008663 A1* 1/2012 Schilling ................ H04B 1/707
 375/146

OTHER PUBLICATIONS

Continuation of U: <URL:http://ieeexplore.ieee.org/stamp/stamp.jsp?arnumber=6533070> <DOI: 10.1364/OFC.2013.OTu31.6>, all pages.*
Slyusar et al., "Extension of the N-OFDM Method to the Case of Orthogonally Polarized Signals", Radioelectronics and Communications Systems, vol. 49, No. 7, pp. 52-56, 2006.

* cited by examiner

TRANSMITTER AND RECEIVER OF SIGNALS THROUGH POLARIZATION ANTENNA AND METHODS FOR CONTROLLING THE SAME

CROSS-REFERENCE TO RELATED APPLICATIONS

This application claims priority to and the benefit of Korean Patent Application No. 10-2014-0015971 filed in the Korean Intellectual Property Office on Feb. 12, 2014, the entire contents of which are incorporated herein by reference.

TECHNICAL FIELD

The present invention relates to a transmitter and a receiver of multiple-subcarrier signals through a polarization antenna and a method for controlling the same, and more particularly, to a transmitter and a receiver of multiple-subcarrier signals through a polarization antenna that insert a training symbol when multiple polarization signals are shifted to each other in a frequency domain in order to prevent interference with each other, and a method for controlling the same.

BACKGROUND ART

A linear polarization antenna includes a vertical polarization antenna that erects an element vertically to the ground to radiate or receive a vertical polarization wave and a horizontal polarization antenna that unfolds the element to the ground in a horizontal direction to radiate or receive a horizontal polarization wave.

Under an ideal environment without a reflection plate, and the like, the horizontal polarization wave and the vertical polarization wave transmitted by a transmitting module interfere less with each other, but cross-polarization discrimination (XPD) representing information on interference between both polarization waves has a value other than 0 under an actual environment.

The XPD represents, when a signal transmitted as the same polarization wave as a receiving antenna and a signal transmitted as a counter polarization wave are both received by the receiving antenna, a ratio between both signals and that the value is not 0 means that both types of polarization waves interfere with each other during transmitting both polarization waves.

When multiple subcarrier signals are transmitted through a multiple polarization antenna in order to prevent the interference between both polarization waves, subcarriers of the signals transmitted as the respective polarization waves may be configured to be shifted as long as a predetermined part of a subcarrier interval. When the subcarriers of the horizontal polarization signal and the vertical polarization signal are located to deviate from each other in a frequency domain, even in the case where the interference between both polarization signals occurs, a subcarrier of an interference signal is not fully superimposed with an original signal, and as a result, it is easier to remove the interference signal.

However, the shift of the subcarrier is helpful to reduce interference between different polarization waves at the time of transmitting data, but there is a higher possibility that training sequences transmitted by the respective polarization waves will give interference when the training sequences exclusively transmitted by the respective polarization waves are transmitted.

In the multiple subcarrier signals using the polarization wave, when a transmitting unit transmits the training sequence to one subcarrier only in one polarization wave and thereafter, a receiving unit receives the training sequence by each polarization antenna, a channel transfer function and an XPD value between the respective polarization waves can be known, and when the training sequences are transmitted with being superimposed with each other, it is difficult to accurately measure the interference between the polarization waves.

SUMMARY OF THE INVENTION

The present invention has been made in an effort to provide a transmitter and a receiver of multiple-subcarrier signals through a polarization antenna and a method for controlling the same that prevent training sequences or pilot subcarriers exclusively transmitted by respective polarization waves from being superimposed with each other when different frequency shifts are applied to a plurality of polarization waves.

The present invention has also been made in an effort to provide a transmitter and a receiver of multiple-subcarrier signals through a polarization antenna and a method for controlling the same that transmits and receives, when a predetermined polarization signal among polarization signals needs to be frequency-shifted, only a data subcarrier included in the corresponding polarization signal which is frequency-shifted, and transmits and receives the training sequence or pilot subcarrier which is not frequency-shifted.

An exemplary embodiment of the present invention provides a data transmitter, including: a demultiplexer configured to demultiplex a data subcarrier, and a training sequence or a pilot subcarrier included in a signal which needs to be frequency-shifted among a plurality of signals; a frequency shift unit configured to frequency-shift the demultiplexed data subcarrier based on a predetermined frequency; a superposition unit configured to generate a polarization signal by superimposing the demultiplexed training sequence or pilot subcarrier, and the frequency-shifted data subcarrier; and a polarization antenna configured to transmit a signal which need not be frequency-shifted and the generated polarization signal among the plurality of signals.

The plurality of signals may include a first signal including a first data subcarrier, and a first training sequence or a first pilot subcarrier which need not be frequency-shifted; and a second signal including a second data subcarrier which needs to be frequency-shifted, and a second training sequence or a second pilot subcarrier which need not be frequency-shifted.

The data transmitter may further include a demodulator configured to generate the plurality of signals including the training sequence or the pilot subcarrier, and the data subcarrier.

The polarization antenna may include a vertical polarization antenna configured to transmit any one signal of the signal which need not be frequency-shifted and the generated polarization signal; and a horizontal polarization antenna configured to transmit the other one signal of the signal which need not be frequency-shifted and the generated polarization signal.

The polarization antenna may transmit the training sequence and the data subcarrier included in each of the signal which need not be frequency-shifted and the generated polarization signal as separate symbols, respectively, or combine the training sequence and the data subcarrier as one symbol to be transmitted.

Another exemplary embodiment of the present invention provides a data receiver, including: a polarization antenna configured to receive a plurality of signals each including a first data subcarrier which is not frequency-shifted and a frequency-shifted second data subcarrier; a selector configured to demultiplex a second data subcarrier, and a second training sequence or a second pilot subcarrier included in a signal including the frequency-shifted second data subcarrier among the plurality of received signals; a frequency shift unit configured to frequency-shift the demultiplexed second data subcarrier based on a predetermined frequency to transform the demultiplexed second data subcarrier to an original second data subcarrier before being frequency-shifted; and a demodulator configured to demodulate the signal including the first data subcarrier, which is not frequency-shifted, received through the polarization antenna, the demultiplexed second training sequence or second pilot subcarrier, and the transformed original second data subcarrier.

The polarization antenna may include a vertical polarization antenna configured to receive any one signal of a first signal including the first data subcarrier which is not frequency-shifted and a second signal including the second data subcarrier which is frequency-shifted; and a horizontal polarization antenna configured to receive the other one signal of the first signal and the second signal.

Yet another exemplary embodiment of the present invention provides a method for controlling a transmitter, including: generating a first signal including a first data subcarrier and a first training sequence or a first pilot subcarrier which need not be frequency-shifted, and a second signal including a second data subcarrier which needs to be frequency-shifted and a second training sequence or a second pilot subcarrier which need not be frequency-shifted, through a modulator; demultiplexing the second data subcarrier, and the second training sequence or the second pilot subcarrier which need to be frequency-shifted, which are included in the second signal, through a demultiplexer; frequency-shifting the demultiplexed second data subcarrier based on a predetermined frequency, through a frequency shift unit; generating a polarization signal by superimposing the demultiplexed second training sequence or second pilot subcarrier and the frequency-shifted second data subcarrier, through a superposition unit; and transmitting each of the first signal which need not be frequency-shifted and the generated polarization signal, through a polarization antenna.

The transmitting of each of the first signal and the generated polarization signal may include: transmitting the first signal, which need not be frequency-shifted, through any one antenna of a vertical polarization antenna and a horizontal polarization antenna, which are included in the polarization antenna; and transmitting the generated polarization signal through the other one antenna of the vertical polarization antenna and the horizontal polarization antenna.

Still another exemplary embodiment of the present invention provides a method for controlling a receiver, including: receiving a plurality of signals each including a first data subcarrier which is not frequency-shifted and a frequency-shifted second data subcarrier, through a polarization antenna; demultiplexing a second data subcarrier, and a first training sequence or a first pilot subcarrier which are included in a signal including the frequency-shifted second data subcarrier among the plurality of received signals, through a selector; frequency-shifting the demultiplexed second data subcarrier based on a predetermined frequency to transform the demultiplexed second data subcarrier to an original second data subcarrier, through a frequency shift unit; and demodulating the signal including the first data subcarrier which is not frequency-shifted, eceived through the polarization antenna, and the first training sequence or the first pilot subcarrier, the demultiplexed second training sequence or second pilot subcarrier, and the transformed original second data subcarrier, through a demodulator.

According to the exemplary embodiments of the present invention, in the transmitter and the receiver of multiple subcarrier signals through a polarization antenna and the method for controlling the same, when the different frequency shifts are applied to the plurality of polarization waves, the training sequences or the pilot subcarriers exclusively transmitted by the respective polarization waves are configured not to be superimposed on each other, thereby preventing the polarization signals including the training sequences or the pilot subcarriers from being superimposed on each other and preventing the error in the XPD measurement or the channel estimation.

According to the exemplary embodiments of the present invention, in the transmitter and the receiver of multiple subcarrier signals through a polarization antenna and the method for controlling the same, when a predetermined polarization signal among the polarization signals needs to be frequency-shifted, only the data subcarrier included in the corresponding polarization signal is frequency-shifted, and the training sequence or the pilot subcarrier is transmitted and received without being shifted, thereby lowering average interference between the polarization waves of the data subcarrier.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is noted that technical terms used in the present invention are used to just describe a specific exemplary embodiment and do not intend to limit the present invention. Unless otherwise defined, the technical terms used in the present invention should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

Unless otherwise apparently specified contextually, a singular expression used in the present invention includes a plural expression. In the present invention, a term such as "comprising" or "including" should not be interpreted as necessarily including all various components or various steps disclosed in the invention, and it should be interpreted that some component or some steps among them may not be included or additional components or steps may be further included.

Terms including ordinal numbers, such as 'first' and 'second', used in the present invention can be used to describe various components, but the components should not be limited by the terms. The above terminologies are used only for distinguishing one component from the other component. For example, a first component may be named a second component and similarly, the second component may also be named the first component, without departing from the scope of the present invention.

Hereinafter, exemplary embodiments of the present invention will be described in detail with reference to the accompanying drawings, in which like reference numerals refer to like or similar elements regardless of reference numerals and a duplicated description thereof will be omitted.

In describing the present invention, when it is determined that the detailed description of the publicly known art related to the present invention may obscure the gist of the present invention, the detailed description thereof will be omitted. Further, it is noted that the accompanying drawings are only for easily understanding the spirit of the present invention and it should not be interpreted that the spirit of the present invention is limited by the accompanying drawings.

Figure 1:
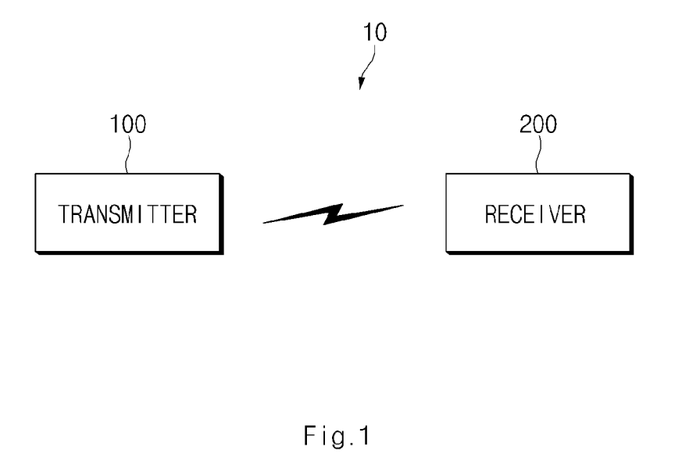
FIG. 1 is a configuration diagram of a communication system according to an exemplary embodiment of the present invention.

FIG. 1 is a configuration diagram of a communication system 10 according to an exemplary embodiment of the present invention.

As illustrated in FIG. 1, the communication system 10 includes a transmitter 100 and a receiver 200. All constituent elements of the communication system 10 illustrated in FIG. 1 are not required, and the communication system 10 may be implemented by more or fewer constituent elements than the constituent elements illustrated in FIG. 1. Herein, the transmitter 100 and the receiver 200 communicate with each other through a wired/wireless communication network.

When the transmitter 100 transmits a plurality of polarization signals, with respect to a polarization signal including a data subcarrier which needs to be frequency-shifted, a training sequence or a specific pilot subcarrier included in the corresponding polarization signal is not frequency-shifted but only a data subcarrier included in the corresponding polarization signal is frequency-shifted and thereafter, the frequency-shifted data subcarrier and the training sequence or the specific pilot subcarrier, which is not frequency-shifted, are superimposed into one signal again and thereafter, the superimposed signal (alternatively, the polarization signal in which only the data subcarrier is frequency-shifted) is transmitted, thereby lowering average inter-polarization wave of the data subcarrier, and preventing the superimposing between the polarization waves for the training sequence or the specific pilot subcarrier.

Figure 2:
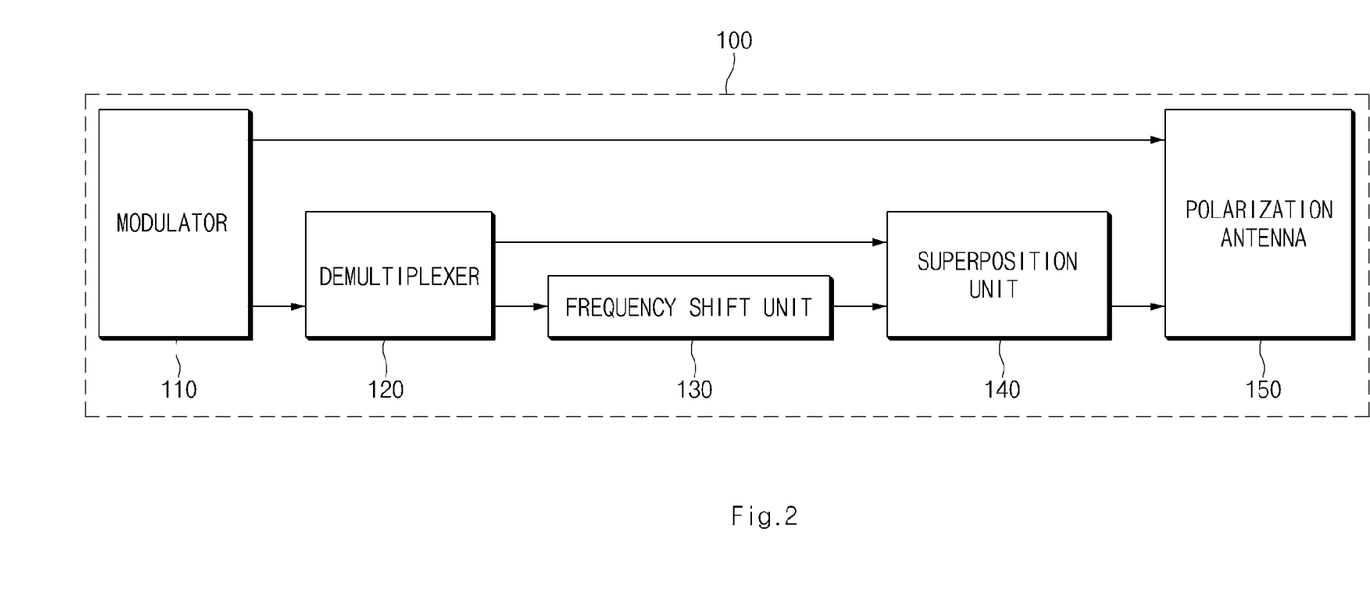
FIG. 2 is a configuration diagram of a transmitter according to an exemplary embodiment of the present invention.

As illustrated in FIG. 2, the transmitter 100 includes a modulator 110, a demultiplexer 120, a frequency shift unit 130, a superposition unit 140, and a polarization antenna 150. All constituent elements of the transmitter 100 illustrated in FIG. 2 are not required, and the transmitter 100 may be implemented by more or fewer constituent elements than the constituent elements illustrated in FIG. 2.

The modulator 110 generates a plurality of signals including the data subcarrier (alternatively, an OFDM symbol/ OFDM signal) and a training sequence (alternatively, a training symbol) or a pilot subcarrier. Herein, the plurality of signals may be signals generated by generating a plurality of OFDM signals by modulating (alternatively, mapping) a plurality of transmission data (alternatively, transmission data signals) desired to be transmitted based on a predetermined modulation method, inserting (alternatively, adding) at least one pilot symbol (alternatively, a pilot symbol) for channel estimation into a predetermined (alternatively, known) position of the modulated signal, generating a plurality of OFDM signals by performing inverse fast Fourier transform (IFFT) on the plurality of signals inserted with the pilot symbol, inserting (alternatively, adding) a cyclic prefix (CP) into each of the generated plurality of OFDM signals, and assigning the training sequence (alternatively, the training symbol) to each of the plurality of OFDM signals inserted with the CP, so as for an empty space not to be present on a time axis with respect on each polarization component. In this case, examples of the predetermined modulation method may include quaternary phase shift keying (QPSK), or quadrature amplitude modulation (QAM) such as 16-QAM and 64-QAM. Some signals of the plurality of corresponding signals have a characteristic that the frequency shift is not required, and the other signals of the plurality of corresponding signals have a characteristic that the frequency shift is required.

The modulation 110 transfers (alternatively, transmits) a signal of which frequency shift is not required, among the plurality of generated signals, to the polarization antenna 150, and transfers a signal of which frequency shift is required, among the plurality of signals, to the demultiplexer 120.

The demultiplexer (DEMUX) 120 receives a signal, which needs to be frequency-shifted, transferred from the modulator 110.

The demultiplexer 120 demultiplexes (alternatively, divides/splits) the received signal, of which the frequency shift is required, to a data subcarrier and a training sequence or a specific pilot subcarrier which is a signal located so as not to be superimposed with a neighboring signal.

The demultiplexer 120 transfers the demultiplexed training sequence or specific pilot subcarrier to the superposition unit 140 and the demultiplexed data subcarrier to the frequency shift unit 130.

The frequency shift unit 130 receives the demultiplexed data subcarrier transferred from the demultiplexer 120.

The frequency shift unit 130 frequency-shifts the received demultiplexed data subcarrier based on a predetermined frequency. Herein, when frequency-shifting the corresponding data subcarrier, the frequency shift unit 130 may perform the frequency shift in a frequency domain or perform the frequency shift by multiplying a complex rotation value in a time domain.

The frequency shift unit 130 transfers the frequency-shifted data subcarrier to the superposition unit 140.

The superposition unit 140 receives the demultiplexed training sequence or specific pilot subcarrier transferred from the demultiplexer 120.

The superposition unit 140 receives the frequency-shifted data subcarrier transferred from the frequency shift unit 130.

The superposition unit 140 superimposes (alternatively, adds both signals to generate one signal) the received training sequence or specific pilot subcarrier, and the frequency-shifted data subcarrier as one signal (alternatively, a second polarization signal).

The polarization antenna 150 receives the signal (alternatively, a first polarization signal) which need not be frequency-shifted, transferred from the modulator 110.

The polarization antenna 150 receives the frequency-shifted signal (alternatively, the second polarization signal) transferred from the superposition unit 140.

The polarization antenna 150 transmits the received signal which need not be frequency-shifted and the frequency-shifted signal through the respective polarization antennas 150.

That is, the signal (alternatively, the first polarization signal), which need not be frequency-shifted, is transmitted through a vertical polarization antenna 151 (alternatively, a horizontal polarization antenna 152) included in the polarization antenna 150, and the frequency-shifted signal (alternatively, the second polarization signal) is transmitted through the horizontal polarization antenna 152 (alternatively, the vertical polarization antenna 151) included in the polarization antenna 150.

In this case, in the plurality of signals (for example, including the first polarization signal, the second polarization signal, and the like) transmitted through the vertical polarization antenna 151 or the horizontal polarization antenna 152, the training sequence or pilot subcarrier included in each signal is kept not being frequency-shifted, and the data subcarrier includes a data subcarrier frequency-shifted according to a predetermined frequency.

In each signal transmitted through the vertical polarization antenna 151 or the horizontal polarization antenna 152, the training sequence (alternatively, the pilot subcarrier) and the data subcarrier may be each transmitted as separate symbols or may be transmitted by being combined (alternatively, superimposed) as one symbol.

Figure 3:
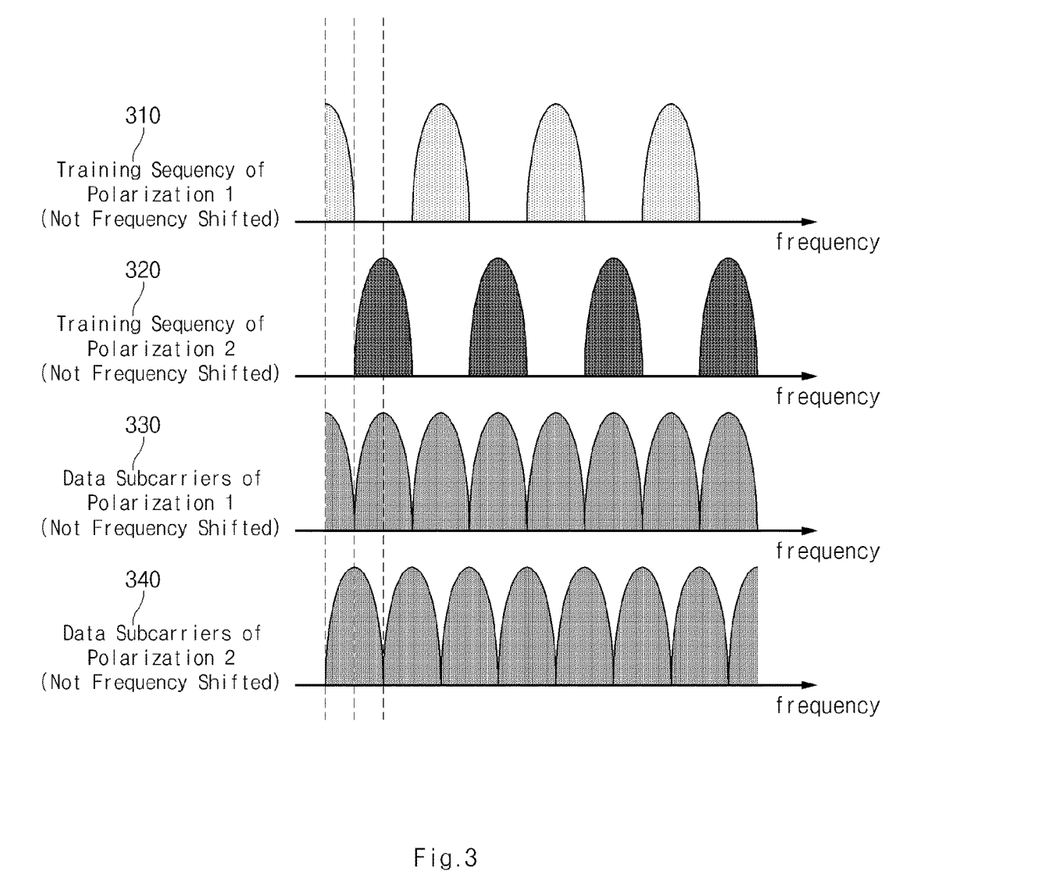
FIGS. 3 and 4 are diagrams illustrating an example of a polarization signal according to an exemplary embodiment of the present invention.

That is, as illustrated in FIG. 3, with respect to the first polarization signal and the second polarization signal included in the plurality of signals, a first training sequence (alternatively, a first pilot subcarrier) 310 and a first data subcarrier 330 included in the first polarization signal may be constituted by respective symbols, and a second training sequence 320 and a second data subcarrier 340 included in the second polarization signal may be constituted by respective symbols. In this case, the first training sequence 310 and the first data subcarrier 330 included in the first polarization signal are frequency-shifted. The second training sequence 320 included in the second polarization signal is not frequency-shifted and the second data subcarrier 340 included in the second polarization signal is frequency-shifted.

Figure 4:
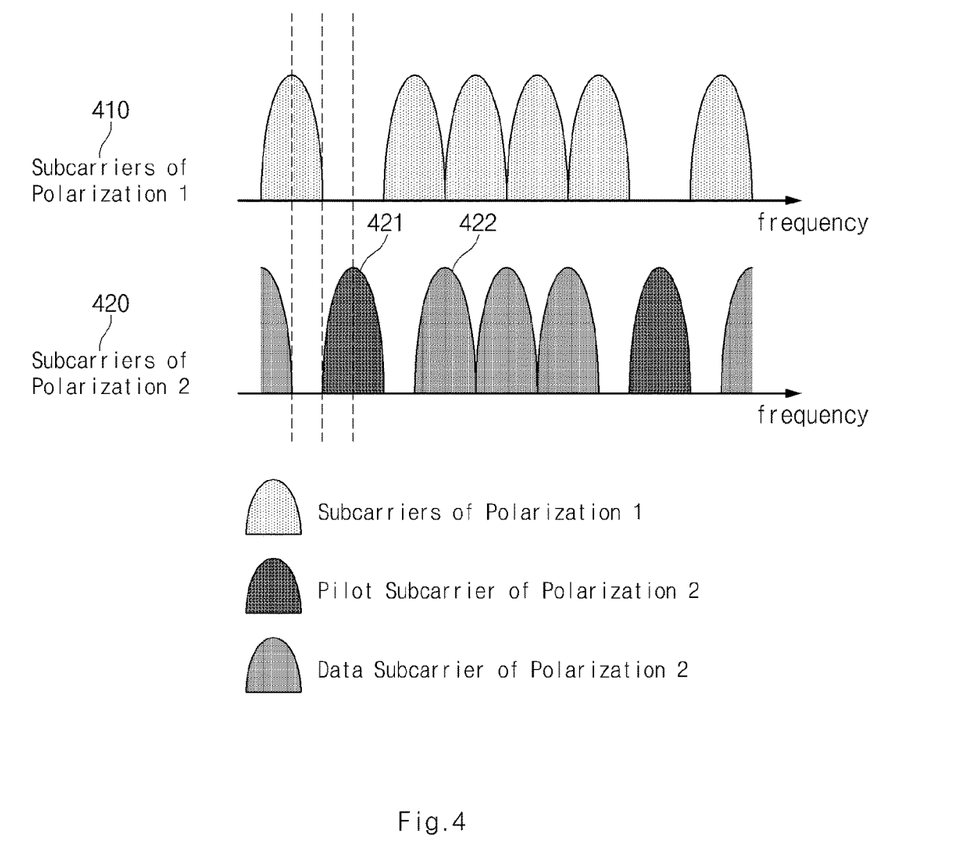

As illustrated in FIG. 4, with respect to the first polarization signal and the second polarization signal included in the plurality of signals, the first training sequence (alternatively, the first pilot subcarrier) and the first data subcarrier are constituted as a first polarization signal 410 which is one signal, and the second pilot subcarrier (alternatively, the second training sequence) and the second data subcarrier are constituted by a second polarization signal 420 which is one signal. In this case, the first training sequence and the first data subcarrier included in the first polarization signal 410 are not frequency-shifted. A second pilot subcarrier 421 included in the second polarization signal 420 is not frequency-shifted, and a second data subcarrier 422 included in the second polarization signal 420 is frequency-shifted. In this case, a space between the second pilot subcarrier 421 and the second data subcarrier 422 in the second polarization signal is configured (alternatively, set) not to be used.

As described above, the training sequence (alternatively, the pilot subcarrier) is not frequency-shifted, and as a result, signals, which are sent by respective polarization waves (alternatively, polarization signals), are not superimposed on each other in the frequency domain, thereby making it possible to accurately measure the XPD.

Only some data subcarriers 340 and 422 among the data subcarriers are frequency-shifted to be less influenced by another data subcarrier 330 transmits as another polarization signal.

Figure 5:
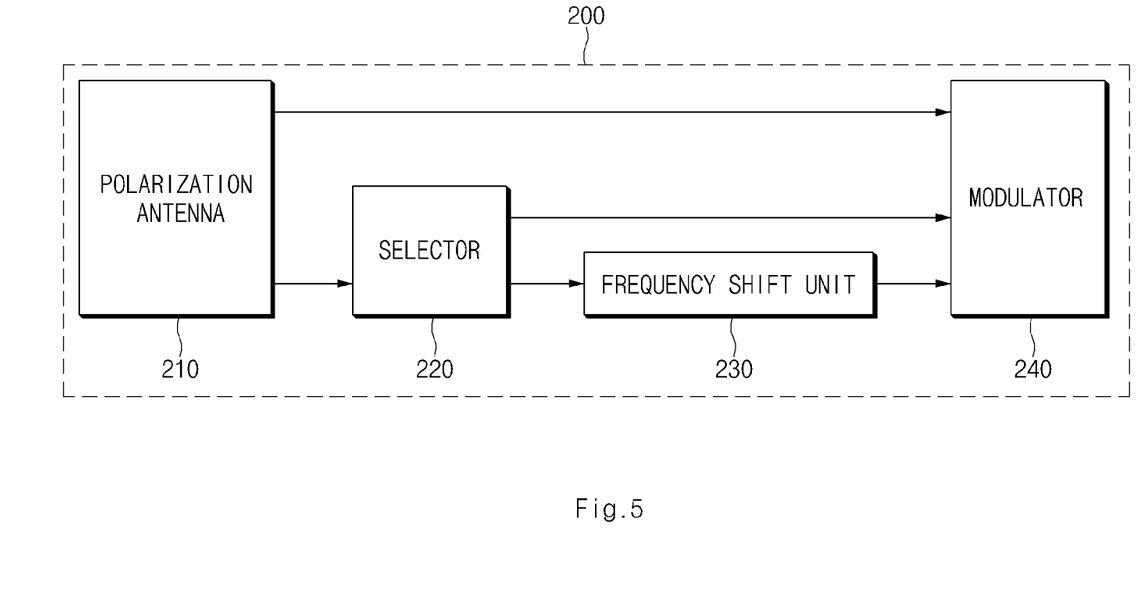
FIG. 5 is a configuration diagram of a receiver according to an exemplary embodiment of the present invention.

As illustrated in FIG. 5, the receiver 200 includes a polarization antenna 210, a selector 220, a frequency shift unit 230, and a demodulator 240. All constituent elements of the receiver 200 illustrated in FIG. 4 are not required, and the receiver 200 may be implemented by more or fewer constituent elements than the constituent elements illustrated in FIG. 4.

The polarization antenna 210 receives the plurality of signals transferred from the transmitter 100. Herein, the received signal may be transformed to a baseband signal (alternatively, baseband data).

That is, the polarization antenna 210 receives the plurality of signals transmitted from the vertical polarization antenna 151 and the horizontal polarization antenna 152 included in the transmitter 100, through a vertical polarization antenna 211 and a horizontal polarization antenna 212 included in the polarization antenna 210. In this case, the vertical polarization antenna 211 (alternatively, the horizontal polarization antenna 212) receives a signal (alternatively, the signal which is not frequency-shifted/the first signal/the first polarization signal) transmitted from the vertical polarization antenna 151 (alternatively, the horizontal polarization antenna 152) included in the transmitter 100, and the horizontal polarization antenna 212 (alternatively, the vertical polarization antenna 211) receives a signal (alternatively, a signal including the frequency-shifted data subcarrier/the second signal/the second polarization signal) transmitted from the horizontal polarization antenna 152 (alternatively, the vertical polarization antenna 151) included in the transmitter 100.

The polarization antenna 210 transfers the signal, which is not frequency-shifted, to the demodulator 240 and the signal including the frequency-shifted data subcarrier to the selector 220, among the plurality of received signals. Herein, the signal which is not frequency-shifted includes the training sequence (alternatively, the pilot subcarrier) which is not frequency-shifted, and the data subcarrier which is not frequency-shifted. The signal including the frequency-shifted data subcarrier includes the training sequence (alternatively, the pilot subcarrier) which is not frequency-shifted, and the frequency-shifted data subcarrier.

The selector (alternatively, the demultiplexer) 220 receives the signal including the frequency-shifted data subcarrier which is transferred from the polarization antenna 210.

The selector 220 selects (alternatively, demultiplexes/divides/splits) the received signal as the data subcarrier (alternatively, the data subcarrier which is frequency-shifted and then transmitted in the transmitter 100), and the training sequence or the specific pilot subcarrier which is a signal located so as not to be superimposed with the neighboring signal.

The selector 220 transfers the training sequence or the specific pilot subcarrier to the demodulator 240, and transfers the data subcarrier (alternatively, the data subcarrier which is frequency-shifted in the transmitter 100) to the frequency shift unit 230.

The frequency shift unit 230 receives the data subcarrier (alternatively, the data subcarrier which is frequency-shifted in the transmitter 100) transferred from the selector 220.

The frequency shift unit 230 frequency-shifts the received data subcarrier based on a predetermined frequency. As described above, the data subcarrier frequency-shifted by the frequency shift unit 230 corresponds to an original data subcarrier before being frequency-shifted in the transmitter 100.

The frequency shift unit 230 transfers the frequency-shifted data subcarrier (alternatively, the transformed data subcarrier) to the demodulator 240.

The demodulator 240 receives the signal which is not frequency-shifted, transferred from the polarization antenna 210.

The demodulator 240 receives the training sequence or the specific pilot subcarrier included in the signal including the frequency-shifted data subcarrier transferred from the selector 220.

The demodulator 240 receives the frequency-shifted data subcarrier (alternatively, the transformed data subcarrier) transferred from the frequency shift unit 230.

The demodulator 240 demodulates the received signal (including, for example, the training sequence/pilot subcarrier which is not frequency-shifted, the data subcarrier which is not frequency-shifted, and the like) which is not frequency-shifted, the training sequence/pilot subcarrier included in the frequency-shifted signal, and the data subcarrier transformed to the original data subcarrier to generate (alternatively, transform/demap) original transmitted information data of a binary data format (alternatively, a plural-bit format). In this case, the training sequence or the pilot subcarrier included in the received signal is used to calculate the XPD and acquire a channel transfer function.

The receiver 200 may further include a CP remover (not illustrated) for removing a CP included in the plurality of received signals (including, for example, the first polarization signal, the second polarization signal, and the like), an FFT unit (not illustrated) for performing fast Fourier transform (FFT) on an OFDM symbol (alternatively, an OFDM signal) included in the plurality of signals (alternatively, a plurality of OFDM symbols/signals included in the plurality of signals from which the CP is removed) from which the CP is removed, and the like. An FFT signal transformed through the FFT unit may be demodulated by the demodulator 240.

As described above, when different frequency shifts are applied to a plurality of polarization waves, training sequences or pilot subcarriers exclusively transmitted by the respective polarization waves may be configured so as not to be superimposed on each other.

As described above, when a predetermined polarization signal needs to be frequency-shifted among the polarization signals, only a data subcarrier included in the corresponding polarization signal may be transmitted/received with being frequency-shifted and the training sequence or the pilot subcarrier may be transmitted/received without being shifted.

Hereinafter, a method for controlling a transmitter and a receiver of multiple subcarrier signals through a polarization antenna according to the present invention will be described in detail with reference to FIGS. 1 to 7.

Figure 6:
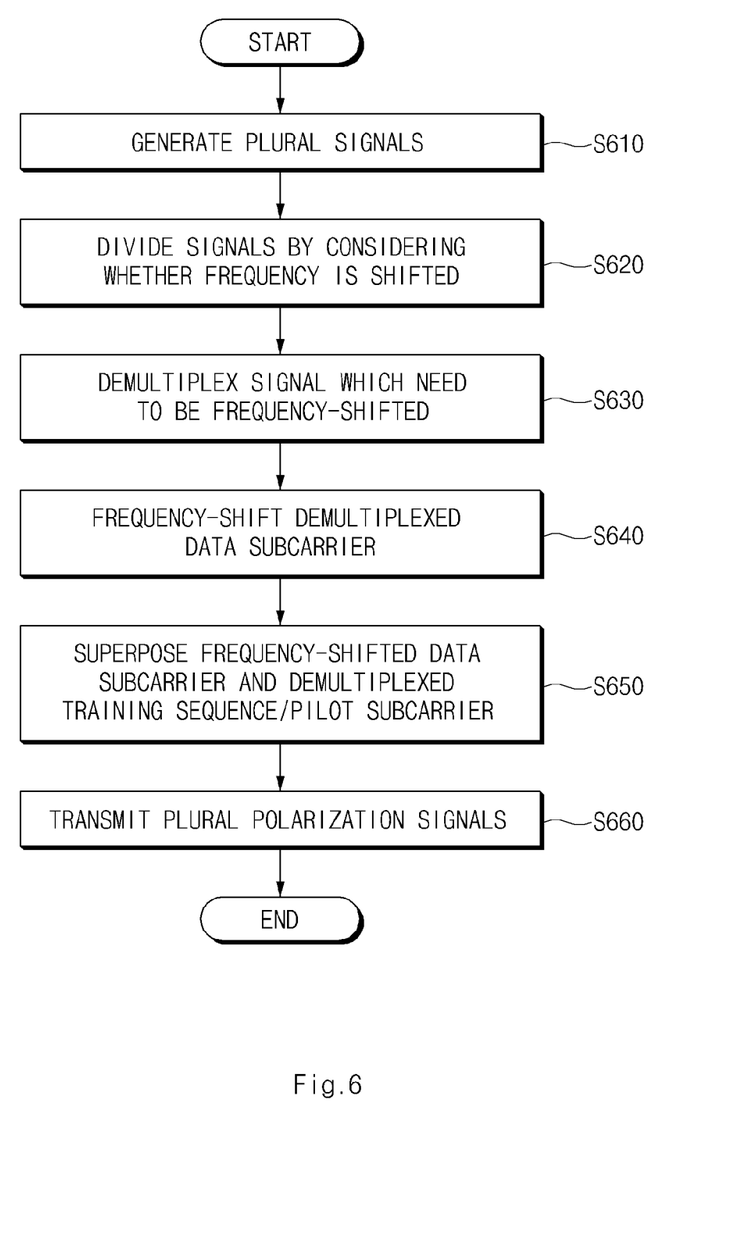
FIG. 6 is a flowchart illustrating a method for controlling, by a transmitter, multiple subcarrier signals through a polarization antenna according to a first exemplary embodiment of the present invention.

FIG. 6 is a flowchart illustrating a method for controlling, by a transmitter, multiple subcarrier signals through a polarization antenna according to a first exemplary embodiment of the present invention.

First, the modulator 110 generates the plurality of signals including the data subcarrier (alternatively, the OFDM symbol/OFDM signal), and the training sequence (alternatively, the training symbol) or the pilot subcarrier.

Herein, the plurality of signals may be signals generated by modulating (alternatively, mapping) a plurality of transmission data (alternatively, transmission data signals) desired to be transmitted, based on a predetermined modulation method, inserting (alternatively, adding) at least one pilot symbol (alternatively, pilot signal) for channel estimation into a predetermined (known) position of the modulated signal, generating a plurality of OFDM signals by performing inverse fast Fourier transform (IFFT) on the plurality of signals inserted with the pilot symbol, inserting (alternatively, adding) the CP to each of the plurality of generated OFDM signals, and assigning the training sequence (alternatively, training symbol) to the plurality of OFDM signals inserted with the CP, so as for the empty space not to be present on a time axis for each polarization component. In this case, examples of the predetermined modulation method may include quaternary phase shift keying (QPSK), and quadrature amplitude modulation (QAM) such as 16-QAM and 64-QAM. Some signals among the plurality of corresponding signals have a characteristic that the frequency shift is not required, and the other signals among the plurality of corresponding signals have a characteristic that the frequency shift is required.

As one example, the modulator 110 generates a first signal including a first data subcarrier and a first training sequence and a second signal including a second data subcarrier and a second training sequence (S610).

Thereafter, the modulator 110 transfers (alternatively, transmits) a signal which need not be frequency-shifted, among the plurality of generated signals, directly to the polarization antenna 150 and transfers a signal, which needs to be frequency-shifted among the plurality of signals, to the demultiplexer 120.

As one example, the modulator 110 transfers the first signal (alternatively, the first polarization signal), which need not be frequency-shifted between the generated first and second signals, to the vertical polarization antenna 151 included in the polarization antenna 150 and transfers the second signal, which needs to be frequency-shifted, to the demultiplexer 120 (S620).

Thereafter, the demultiplexer 120 demultiplexes (alternatively, divides/splits) the signal which needs to be frequency-shifted, transferred from the modulator 110 to the data subcarrier included in the corresponding signal which needs to be frequency-shifted and the training sequence or the specific pilot subcarrier which is the signal located so as not to be superimposed on the neighboring signal.

The demultiplexer 120 transfers the demultiplexed training sequence or specific pilot subcarrier to the superposition unit 140, and transfers the demultiplexed data subcarrier to the frequency shift unit 130.

As one example, the demultiplexer 120 demultiplexes the second signal to the second data subcarrier and the second training sequence. The demultiplexer 120 transfers the second training sequence to the superposition unit 140 and transfers the second data subcarrier to the frequency shift unit 130 (S630).

Thereafter, the frequency shift unit 130 frequency-shifts the data subcarrier, which is transferred from the demultiplexer 120, based on a predetermined frequency. Herein, the frequency-shift may be performed in the frequency domain or performed by multiplying a complex rotation value in the time domain.

The frequency shift unit 130 transfers the frequency-shifted data subcarrier to the superposition unit 140.

As one example, the frequency shift unit 130 frequency-shifts the second data subcarrier as high as a predetermined frequency and transfers the frequency-shifted second data subcarrier to the superposition unit 140 (S640).

Thereafter, the superposition unit 140 receives the demultiplexed training sequence or specific pilot subcarrier transferred from the demultiplexer 120.

The superposition unit 140 receives the frequency-shifted data subcarrier transferred from the frequency shift unit 130.

The superposition unit 140 superimposes (alternatively, adds both signals to generate one signal) the received training sequence or specific pilot subcarrier, and the frequency-shifted data subcarrier as one signal.

The superposition unit 140 transfers the signal superimposed as one signal to the polarization antenna 150.

As one example, the superposition unit 140 adds the second training sequence and the frequency-shifted second data subcarrier to generate one signal (alternatively, the second polarization signal/the frequency-shifted second signal) and transfers the generated signal to the polarization antenna 150 (S650).

Thereafter, the polarization antenna 150 receives the signal which need not be frequency-shifted, transferred from the modulator 110.

The polarization antenna 150 receives the frequency-shifted signal transferred from the superposition unit 140.

The polarization antenna 150 transmits the received signal which need not be frequency-shifted and the frequency-shifted signal through the respective polarization antennas 150.

As one example, the vertical polarization antenna 151 included in the polarization antenna 150 receives the first signal (alternatively, the first polarization signal) which need not be frequency-shifted, transferred from the modulator 110, and transmits the received first signal.

The horizontal polarization antenna 152 included in the polarization antenna 150 receives the frequency-shifted second signal (alternatively, the second polarization signal) transferred from the superposition unit 140, and transmits the received frequency-shifted second signal (S660).

Figure 7:
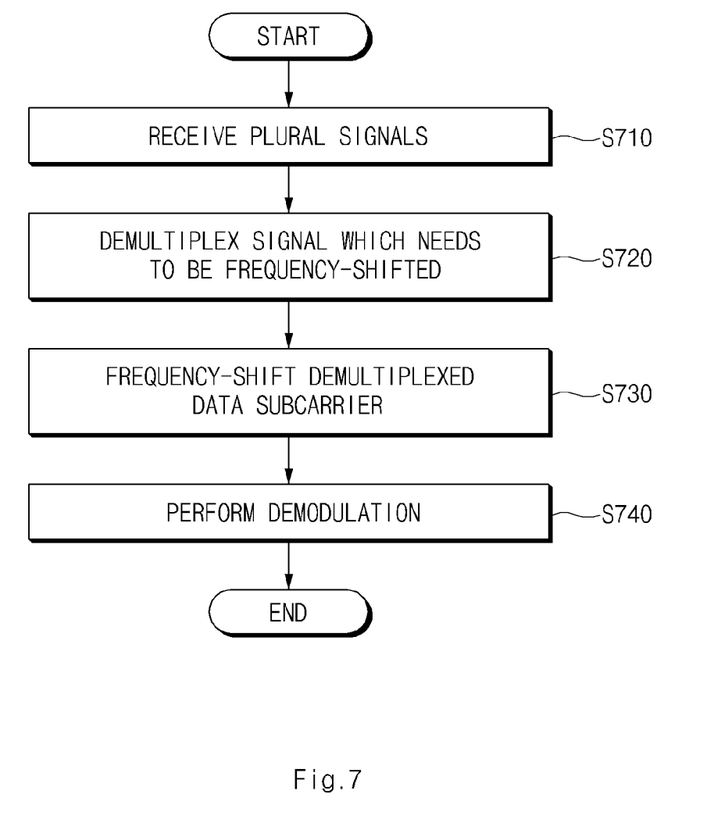
FIG. 7 is a flowchart illustrating a method for controlling, by a receiver, multiple subcarrier signals through a polarization antenna according to a second exemplary embodiment of the present invention.

FIG. 7 is a flowchart illustrating a method for controlling, by a receiver, multiple subcarrier signals through a polarization antenna according to a second exemplary embodiment of the present invention.

First, the polarization antenna 210 receives the plurality of signals (alternatively, the plurality of polarization signals) transmitted from the vertical polarization antenna 151 and the vertical polarization antenna 152 which are included in the transmitter 100. Herein, the received signal may be transformed to a baseband signal (alternatively, baseband data). The plurality of received signals includes the signal (alternatively, the first signal/the first polarization signal) which is not frequency-shifted, the signal (alternatively, the second signal/the second polarization signal) including the data subcarrier which is frequency-shifted, and the like.

The polarization antenna 210 transfers the signal, which is not frequency-shifted among the plurality of received signals, to the demodulator 240, and transfers the signal including the frequency-shifted data subcarrier to the selector 220.

As one example, the vertical polarization antenna 211 receives the first signal (alternatively, the first polarization signal) which is not frequency-shifted, transmitted from the vertical polarization antenna 151 included in the transmitter 100, and transfers the received first signal, which is not frequency-shifted, to the demodulator 240.

The horizontal polarization antenna 212 receives the second signal (alternatively, the second polarization signal) including the frequency-shifted second data subcarrier, transmitted from the horizontal polarization antenna 152 included in the transmitter 100, and transfers the second signal including the frequency-shifted second data subcarrier to the selector 220 (S710).

Thereafter, the selector 220 selects (alternatively, demultiplexes/divides/splits) the received signal as the data subcarrier (alternatively, the data subcarrier which is frequency-shifted and then transmitted in the transmitter 100) included in the signal transferred from the polarization antenna 210, and the training sequence or the specific pilot subcarrier which is the signal located so as not to be superimposed with the neighboring signal.

The selector 220 transfers the training sequence or the specific pilot subcarrier to the demodulator 240, and transfers the data subcarrier to the frequency shift unit 230. As one example, the selector 220 divides the second signal to each of the second data subcarrier and the second training sequence. The selector 220 transfers the second training sequence to the demodulator 240, and transfers the second data subcarrier to the frequency shift unit 230 (S720).

Thereafter, the frequency shift unit 230 frequency-shifts the data subcarrier transferred from the selector 220, based on a predetermined frequency, to transform the data subcarrier, which is frequency-shifted and then transmitted in the transmitter 100, to the original data subcarrier.

The frequency shift unit 230 transfers the frequency-shifted original data subcarrier (alternatively, the transformed data subcarrier) to the demodulator 240.

As one example, the frequency shift unit 230 frequency-shifts the second data subcarrier as high as a predetermined frequency, and transfers the frequency-shifted second data subcarrier (alternatively, the second data subcarrier transformed to the original second data subcarrier) to the demodulator 240 (S730).

Thereafter, the demodulator 240 receives the signal which is not frequency-shifted, transferred from the polarization antenna 210.

The demodulator 240 receives the training sequence or the specific pilot subcarrier included in the frequency-shifted signal (alternatively, the signal including the frequency-shifted data subcarrier) transferred from the selector 220.

The demodulator 240 receives the data subcarrier (alternatively, the original data subcarrier/the transformed data subcarrier) included in the frequency-shifted signal transferred from the frequency shift unit 230.

The demodulator 240 performs demodulation based on the received signal (including, for example, the training sequence/pilot subcarrier which is not frequency-shifted, the data subcarrier which is not frequency-shifted, and the like) which is not frequency-shifted, the training sequence or the specific pilot subcarrier included in the frequency-shifted signal, and the data subcarrier transformed to the original data subcarrier, so as to generate (alternatively, transform/demap) original transmitted information data of a binary data format (alternatively, a plural-bit format).

As one example, the demodulator 240 receives the first signal (including, for example, the first training sequence, the first data subcarrier, and the like, which are not frequency-shifted) which is not frequency-shifted, transferred from the vertical polarization antenna 211, receives the second training sequence included in the frequency-shifted second signal transferred from the selector 220, and receives the original second data subcarrier transformed to the original second data subcarrier before frequency-shifting the second data subcarrier included in the frequency-shifted second signal transferred from the frequency shift unit 230, transferred from the frequency shift unit 230 in the transmitter 100.

The demodulator 240 demodulates the received first signal, second training sequence, and original second data subcarrier to generate (alternatively, transform) the original transmitted information data of a binary data format (alternatively, a plural-bit format) (S740).

According to the exemplary embodiments of the present invention, as described above, when the different frequency shifts are applied to the plurality of polarization waves, the training sequences or the pilot subcarriers exclusively transmitted by the respective polarization waves are configured not to be superimposed on each other, thereby preventing the polarization signals including the training sequences or the pilot subcarriers from being superimposed on each other, and preventing the error in the XPD measurement or the channel estimation.

According to the exemplary embodiments of the present invention, as described above, when a predetermined polarization signal among the polarization signals needs to be frequency-shifted, only the data subcarrier included in the corresponding polarization signal is transmitted and received with being frequency-shifted, and the training sequence or the pilot subcarrier is transmitted and received without being shifted, thereby lowering average interference between the polarization waves of the data subcarrier.

Those skilled in the art can modify and change the above description within the scope without departing from an essential characteristic of the present invention. Accordingly, the exemplary embodiments disclosed herein are intended not to limit but to describe the technical spirit of the present invention, and the scope of the spirit of the present invention is not limited to the exemplary embodiments. The scope of the present invention should be interpreted by the appended claims, and all the technical spirit in the equivalent range should be interpreted to be embraced in the scope of the present invention.

What is claimed is:

1. A transmitter, comprising:
a demultiplexer configured to demultiplex a data subcarrier, and a training sequence or a pilot subcarrier included in a signal which needs to be frequency-shifted among a plurality of signals;
a frequency shift unit configured to frequency-shift the demultiplexed data subcarrier based on a predetermined frequency;
a superposition unit configured to generate a polarization signal by superimposing the demultiplexed training sequence or pilot subcarrier, and the frequency-shifted data subcarrier; and
a polarization antenna configured to transmit a signal which need not be frequency-shifted and the generated polarization signal, among the plurality of signals.

2. The transmitter of claim 1, wherein the plurality of signals includes:
a first signal including a first data subcarrier, and a first training sequence or a first pilot subcarrier which need not be frequency-shifted; and
a second signal including a second data subcarrier which needs to be frequency-shifted, and a second training sequence or a second pilot subcarrier which need not be frequency-shifted.

3. The transmitter of claim 1, further comprising:
a modulator configured to generate the plurality of signals including the training sequence or the pilot subcarrier, and the data subcarrier.

4. The transmitter of claim 1, wherein the polarization antenna includes:
a vertical polarization antenna configured to transmit any one signal of the signal which need not be frequency-shifted and the generated polarization signal; and
a horizontal polarization antenna configured to transmit another one signal of the signal which need not be frequency-shifted and the generated polarization signal.

5. The transmitter of claim 1, wherein the polarization antenna transmits the training sequence and the data subcarrier included in each of the signal which need not be frequency-shifted and the generated polarization signal as separate symbols, respectively, or combines the training sequence and the data subcarrier as one symbol to be transmitted.

6. A receiver, comprising:
a polarization antenna configured to receive a plurality of signals each including a first data subcarrier which is not frequency-shifted and a frequency-shifted second data subcarrier;
a selector configured to demultiplex a second data subcarrier, and a second training sequence or a second pilot subcarrier included in a signal including the frequency-shifted second data subcarrier among the plurality of received signals;
a frequency shift unit configured to frequency-shift the demultiplexed second data subcarrier based on a predetermined frequency, to transform the demultiplexed second data subcarrier to an original second data subcarrier before being frequency-shifted; and
a demodulator configured to demodulate the signal including the first data subcarrier, which is not frequency-shifted, received through the polarization antenna, the demultiplexed second training sequence or second pilot subcarrier, and the transformed original second data subcarrier.

7. The receiver of claim 6, wherein the polarization antenna includes:
a vertical polarization antenna configured to receive any one signal of a first signal including the first data subcarrier which is not frequency-shifted and a second signal including the second data subcarrier which is frequency-shifted; and
a horizontal polarization antenna configured to receive the other one signal of the first signal and the second signal.

8. A method for controlling a transmitter, the method comprising:
generating a first signal including a first data subcarrier and a first training sequence or a first pilot subcarrier which need not be frequency-shifted, and a second signal including a second data subcarrier which needs to be frequency-shifted and a second training sequence or a second pilot subcarrier which need not be frequency-shifted, through a modulator;

demultiplexing the second data subcarrier, and the second training sequence or the second pilot subcarrier which need to be frequency-shifted, which are included in the second signal, through a demultiplexer;

frequency-shifting the demultiplexed second data subcarrier based on a predetermined frequency, through a frequency shift unit;

generating a polarization signal by superimposing the demultiplexed second training sequence or second pilot subcarrier and the frequency-shifted second data subcarrier, through a superposition unit; and transmitting each of the first signal which need not be frequency-shifted and the generated polarization signal, through a polarization antenna.

9. The method of claim 8, wherein the transmitting of each of the first signal and the generated polarization signal includes:

transmitting the first signal, which need not be frequency-shifted, through any one antenna of a vertical polarization antenna and a horizontal polarization antenna, which are included in the polarization antenna; and transmitting the generated polarization signal through the other one antenna of the vertical polarization antenna and the horizontal polarization antenna.

10. A method for controlling a receiver, the method comprising:

receiving a plurality of signals each including a first data subcarrier which is not frequency-shifted and a frequency-shifted second data subcarrier, through a polarization antenna;

demultiplexing a second data subcarrier, and a first training sequence or a second pilot subcarrier which are included in a signal including the frequency-shifted second data subcarrier among the plurality of received signals, through a selector;

frequency-shifting the demultiplexed second data subcarrier based on a predetermined frequency, to transform the demultiplexed second data subcarrier to an original second data subcarrier, through a frequency shift unit; and demodulating the signal including the first data subcarrier which is not frequency-shifted, received through the polarization antenna, and the first training sequence or the first pilot subcarrier, the demultiplexed second training sequence or second pilot subcarrier, and the transformed original second data subcarrier, through a demodulator.

* * * * *